Jan. 31, 1950     A. C. ENGELHEART     2,496,085
AUTO SUNSHADE
Filed Aug. 25, 1948     2 Sheets-Sheet 1
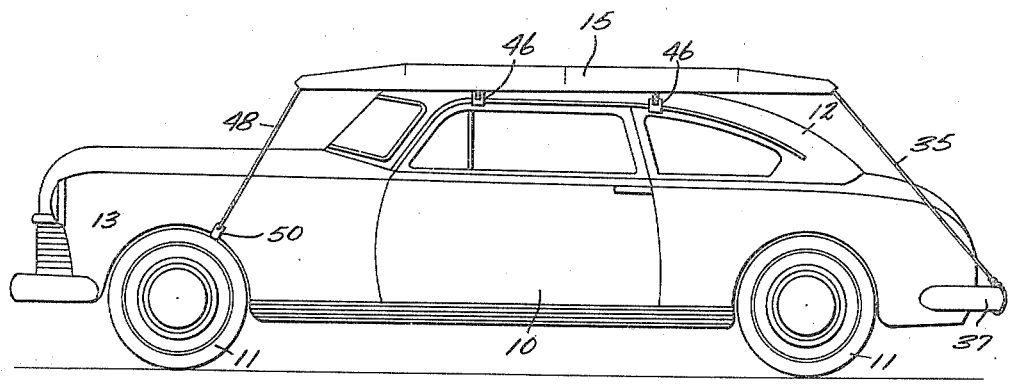
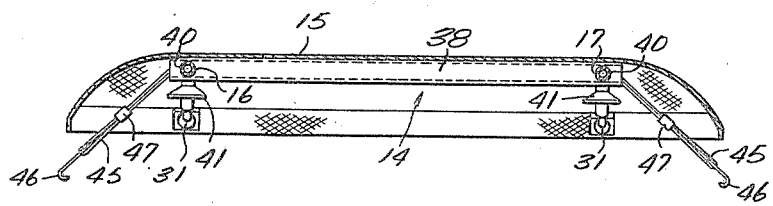
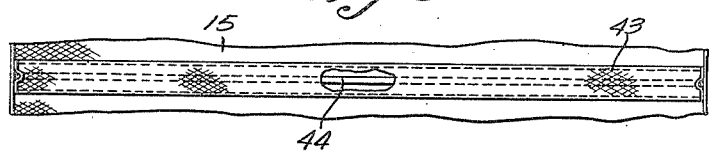
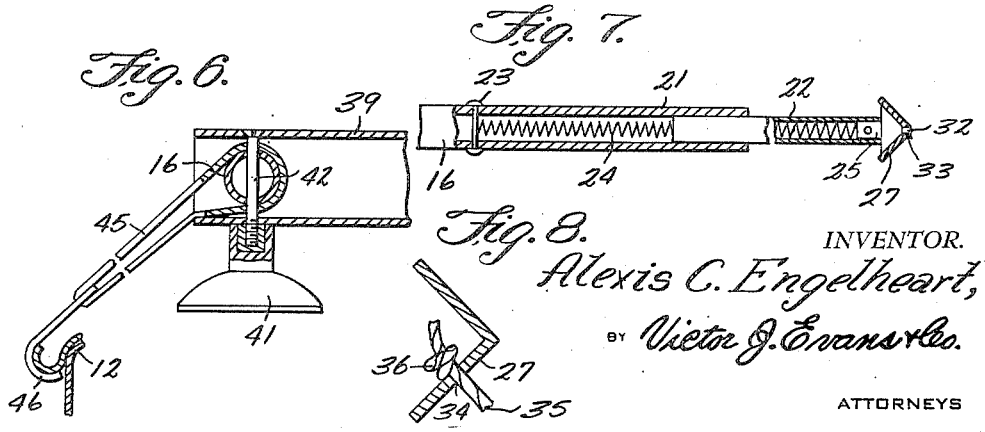
INVENTOR.
Alexis C. Engelheart,
BY Victor J. Evans & Co.
ATTORNEYS Jan. 31, 1950
A. C. ENGELHEART
2,496,085
AUTO SUNSHADE
Filed Aug. 25, 1948
2 Sheets-Sheet 2
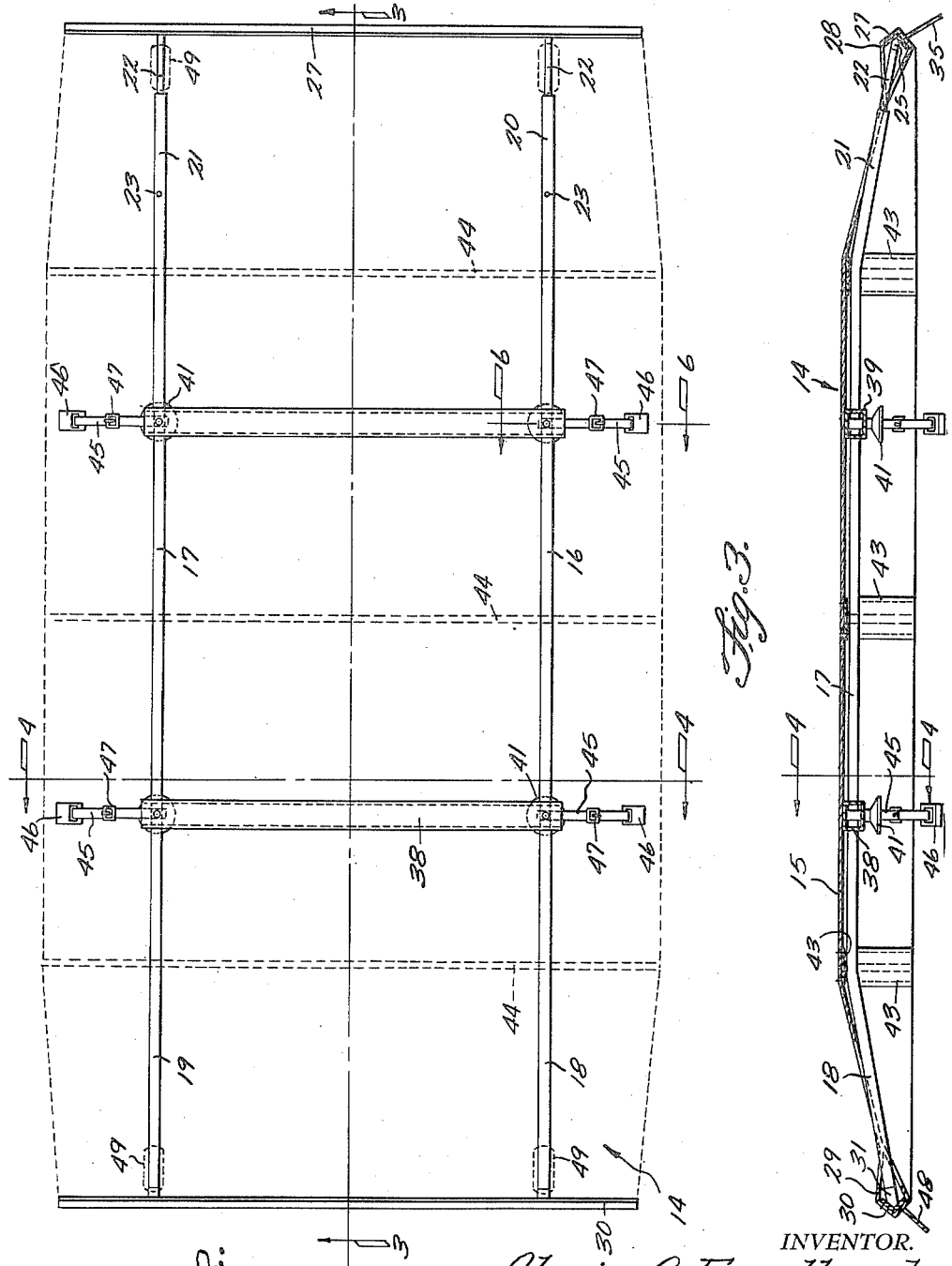
INVENTOR.
Alexis C. Engelheart,
BY Victor J. Evans & Co.
ATTORNEYS Patented Jan. 31, 1950

2,496,085

UNITED STATES PATENT OFFICE 2,496,085

AUTO SUNSHADE

Alexis C. Engelheart, New Orleans, La.

Application August 25, 1948, Serial No. 46,011

5 Claims. (Cl. 296—137)

This invention relates to a sunshade, and more particularly to a sunshade for an automobile.

An object of the invention is to provide a sunshade that will shield substantially the entire body of a vehicle from direct contact by the sun's rays.

Another object of the invention is to provide a vehicle sunshade or canopy which is extremely simple and inexpensive to manufacture.

Other objects and advantages will be apparent from the following description.

In the accompanying drawings forming a part of this application, and in which like numerals are employed to designate like parts throughout the same:

Figure 1 is a side elevational view of a vehicle provided with a sunshade according to the present invention;

Figure 2 is a top plan view of the frame for supporting a canvas cover;

Figure 3 is a sectional view taken on line 3—3 of Figure 2;

Figure 4 is a sectional view taken on line 4—4 of Figure 3;

Figure 5 is a fragmentary sectional view taken to illustrate certain constructional details;

Figure 6 is an enlarged sectional view taken on line 6—6 of Figure 2;

Figure 7 is a fragmentary sectional view illustrating a portion of the frame;

Figure 8 is a view showing certain construction details thereof.

Referring to the drawings, the numeral 10 designates an automobile provided with front and rear wheels 11, a top 12, and front fenders 13. Supported on the top 12 of the vehicle is a frame 14 for the support thereon of a canvas cover or canopy 15.

The frame 14 is preferably fabricated of aluminum and comprises a pair of elongated, longitudinally-extending, tubular, open-ended side braces 16 and 17. The braces 16 and 17 are each provided with a bent front portion 18 and 19, respectively, which is inclined downwardly therefrom. The braces 16 and 17 are each further provided with a bent rear portion 20 and 21, respectively, which is inclined downwardly therefrom. Slidably mounted in each of the rear portions 20 and 21 is a male member 22. A headed pin or rivet 23 projects transversely through each of the rear portions of the side braces and positioned within the rear portions and interposed between the male members 22 and the pin 23 is a coil spring 24 for normally biasing the male members 22 out of the open ends of the rear portions of the side braces 16 and 17. A wedge-like casting 25 is secured to the outer end of each of the male members 22 and the castings 25 abut an elongated angle bar 27. The angle bar 27 is positioned in a transversely-extending pocket 28 in the canvas cover 15. The castings 28 are each provided with a projecting detent 32 which registers with openings 33 in the angle bar 27. The angle bar 27 is provided with apertures 34 and extending through the apertures 34 is a cable 35 having a knot 36 on one end and its other end secured to the rear bumper 37 of the vehicle.

The other end of the cover 15 is provided with a transversely-extending pocket 29 for the reception therein of an elongated angle bar 30, there being a wedge-like casting 31 carried by the front portions 18 and 19 and the castings 31 abut the angle bar 30.

A pair of hollow, rectangular bars 38 and 39 are arranged transversely with respect to the side braces 16 and 17. The bars 38 and 39 are each provided with openings 40 through which extend the side braces 16 and 17. Dependingly carried by the bars 38 and 39 of the frame 14 is a plurality of suction cups 41 for engagement with the top 12 of the vehicle, there being a vertically-disposed threaded bolt 42 extending through the bars, tubing and suction cups to provide a support therefor and maintain the bars and braces in alignment.

The cover 15 is provided with a plurality of spaced, parallel, transversely-extending pockets 43 for the reception therein of a stay rod or rib 44 for maintaining the cover in extended or opened position on the frame.

For securing the frame 14 and cover 15 on top of the vehicle, a pair of straps 45 extend around each of the side braces 16 and 17 and the straps are provided with hooks 46 on one end for engagement with the longitudinally-extending rain spout or drip shield on the side of the vehicle. For adjusting the length of the strap 45, a buckle assembly 47 is provided. Cables 48 provided with clamps 50 connect the front angle bar 30 to the front fenders 13 of the vehicle for maintaining the frame on top of the vehicle. The cover 15 is provided with a plurality of cut-out portions 49 which are arranged so that the bent portions of the side braces 16 and 17 can project therethrough without tearing the canvas cover 15.

In use, the frame 14 is assembled and supported on top of the vehicle to be shielded from the sun's rays. The cover 15 is arranged over the frame and the angle bars 27 and 30 are inserted in the pockets 28 and 29 of the canopy 15. The plurality of bent stay rods 44 are inserted in the transverse pockets 43 of the cover 15 which coacts with the rest of the frame to maintain the cover 15 in its extended position on the vehicle. The clamps 50, cables 35 and hooks 46 maintain the frame and cover in an immobile position on the top of the vehicle.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a device for protecting a vehicle from the sun's rays, a frame, said frame including a pair of spaced, parallel side braces, a pair of spaced, parallel bars arranged transversely of said side braces and operatively connected to the latter, a cover provided with a transversely-disposed pocket in each end thereof supported on said side braces and bars, an angle bar positioned within each of said pockets, a casting carried by the front end of each of said side braces abutting one of said angle bars, a male member slidably carried by the rear end of each of said side braces, a casting secured to the outer end of each of said male members and abutting the other of said angle bars, and resilient means operatively connected to each of said male members for biasing the latter toward the other of said angle bars for maintaining said cover in extended position.

2. In a device for protecting a vehicle from the sun's rays, a frame, said frame including a pair of spaced, parallel, side braces, a pair of spaced, parallel bars arranged trnsversely of said side braces and operatively connected to the latter, a cover provided with a transversely-disposed pocket in each end thereof supported on said side braces and bars, an angle bar positioned within each of said pockets, a casting carried by the front end of each of said side braces abutting one of said angle bars, a male member slidably carried by the rear end of each of said side braces, a casting secured to the outer end of each of said male members and abutting the other of said angle bars, resilient means embodying a coil spring operatively connected to each of said male members for biasing the latter toward the other of said angle bars for maintaining said cover in extended position, there being a plurality of intermediate pockets extending transversely across said cover, and a stay rod positioned within each of said intermediate pockets.

3. In a device for protecting a vehicle from the sun's rays, a frame, said frame including a pair of spaced, parallel side braces, a pair of spaced, parallel bars arranged transversely of said side braces and operatively connected to the latter, a cover provided with a transversely-disposed pocket in each end thereof supported on said side braces and bars, an angle bar positioned within each of said pockets, the front and rear ends of said side braces being bent downwardly, there being a plurality of cut-outs in said cover for the reception of a portion of the bent ends of said side braces for preventing damage to said cover, a casting carried by the front end of each of said side braces abutting one of said angle bars, a male member slidably carried by the rear end of each of said side braces, a casting secured to the outer end of each of said male members and abutting the other of said angle bars, and resilient means operatively connected to each of said male members for biasing the latter toward the other of said angle bars for maintaining said cover in extended position.

4. In a device for protecting a vehicle from the sun's rays, a frame, said frame carrying a pair of spaced, parallel side braces, a pair of spaced, parallel bars arranged transversely of said side braces and operatively connected to the latter, a cover provided with a transversely-disposed pocket in each end thereof supported on said side braces and bars, an angle bar positioned within each of said pockets, the front and rear ends of said side braces being bent downwardly, there being a plurality of cut-outs in said cover for the reception of a portion of the bent ends of said side braces for preventing damage to said cover, a casting carried by the front end of each of said side braces abutting one of said angle bars, a male member slidably carried by the rear end of each of said side braces, a casting secured to the outer end of each of said male members and abutting the other of said angle bars, resilient means operatively connected to each of said members for maintaining said cover in extended position, there being a plurality of intermediate pockets extending transversely across said cover, and a stay rod positioned within each of said intermediate pockets.

5. In a device for protecting a vehicle from the sun's rays, a frame, said frame including a pair of side braces, a plurality of bars arranged transversely of said side braces and operatively connected to the latter, a cover provided with a pocket in each end thereof supported on said side braces and bars, an angle bar positioned within each of said pockets, a casting carried by the front end of each of said side braces abutting one of said angle bars, a male member slidably carried by the rear end of each of said side braces, a casting secured to the outer end of each of said male members and abutting the other of said angle bars, and resilient means operatively connected to each of said male members for biasing the latter toward the other of said angle bars for maintaining said cover in extended position.

ALEXIS C. ENGELHEART.

REFERENCES CITED

The following references are of record in the file of this patent:

UNITED STATES PATENTS

| Number | Name | Date |
| --- | --- | --- |
| 1,733,007 | Dahl | Oct. 22, 1929 |
| 2,231,293 | Norman | Feb. 11, 1941 |
| 2,405,348 | Engelheart | Aug. 6, 1946 |